(12) United States Patent
Asami

(10) Patent No.: US 8,490,599 B2
(45) Date of Patent: Jul. 23, 2013

(54) ABNORMALITY DETERMINATION APPARATUS AND ABNORMALITY DETERMINATION METHOD FOR INTERNAL COMBUSTION ENGINE

(75) Inventor: Yoshikazu Asami, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 25 days.

(21) Appl. No.: 13/156,414

(22) Filed: Jun. 9, 2011

(65) Prior Publication Data
US 2011/0303188 A1 Dec. 15, 2011

(30) Foreign Application Priority Data
Jun. 9, 2010 (JP) ................................. 2010-132283

(51) Int. Cl.
*F02P 5/04* (2006.01)
(52) U.S. Cl.
USPC ................................. 123/406.48; 123/568.11
(58) Field of Classification Search
USPC ..... 701/101, 105, 114, 108, 109; 123/406.48, 123/568.11, 568.14, 568.16, 568.22, 568.24; 73/114.01, 114.62, 114.63, 114.69, 114.74
See application file for complete search history.

(56) References Cited

U.S. PATENT DOCUMENTS

| 5,513,616 | A | 5/1996 | Matsumoto et al. | |
|---|---|---|---|---|
| 6,684,830 | B2 * | 2/2004 | Miyashita | 123/90.15 |
| 7,104,259 | B2 * | 9/2006 | Terada | 123/568.16 |
| 2002/0161495 | A1 * | 10/2002 | Yamaki | 701/33 |
| 2003/0083176 | A1 * | 5/2003 | Mori | 477/62 |
| 2003/0209234 | A1 * | 11/2003 | Kinomura et al. | 123/568.22 |
| 2005/0199050 | A1 * | 9/2005 | Matsumoto | 73/117.3 |
| 2005/0199216 | A1 * | 9/2005 | Matsumoto | 123/396 |
| 2005/0217644 | A1 * | 10/2005 | Shimazaki et al. | 123/501 |
| 2006/0070605 | A1 * | 4/2006 | Akihisa et al. | 123/478 |
| 2008/0306676 | A1 * | 12/2008 | Akihisa et al. | 701/104 |

FOREIGN PATENT DOCUMENTS

| JP | 62-126273 A | 6/1987 |
|---|---|---|
| JP | 03-141846 A | 6/1991 |
| JP | 03-246360 A | 11/1991 |
| JP | 6200833 A | 7/1994 |
| JP | 06-249078 A | 9/1994 |
| JP | 2009-257095 A | 11/2009 |
| JP | 2010024901 A | 2/2010 |
| JP | 2010025059 A | 2/2010 |
| JP | 2010-053719 A | 3/2010 |
| JP | 2010-059852 A | 3/2010 |

* cited by examiner

*Primary Examiner* — John Kwon
*Assistant Examiner* — Johnny Hoang
(74) *Attorney, Agent, or Firm* — Gifford, Krass, Sprinkle, Anderson & Citkowski, P.C.

(57) ABSTRACT

An engine ECU performs a process including the steps of performing an external EGR and advancing ignition timing of all cylinders of an engine, retarding ignition timing cylinder by cylinder in sequential order when no knocking had occurred before performing the external EGR and advancing the ignition timing and knocking occurred after performing the external EGR and advancing the ignition timing, and determining that a passage provided for a cylinder in which the retardation of ignition timing caused a shift from a state in which knocking occurs to a state in which no knocking occurs is clogged.

5 Claims, 5 Drawing Sheets

ABNORMALITY DETERMINATION APPARATUS AND ABNORMALITY DETERMINATION METHOD FOR INTERNAL COMBUSTION ENGINE

CROSS-REFERENCE TO RELATED APPLICATIONS

This nonprovisional application is based on Japanese Patent Application No. 2010-132283 filed on Jun. 9, 2010 with the Japan Patent Office, the entire contents of which are hereby incorporated by reference.

BACKGROUND OF THE INVENTION

1. Field of the Invention

The present invention relates to an abnormality determination apparatus for an internal combustion engine, and particularly to a technique of determining that a passage for allowing exhaust gas discharged from a cylinder to be returned to the cylinder has been clogged.

2. Description of the Background Art

An internal combustion engine provided with an EGR (Engine Gas Recirculation) system is known. With the EGR system, pumping loss and unburned gas can be reduced by means of an external EGR for allowing exhaust gas discharged from a cylinder to an exhaust passage to be recirculated to an intake passage.

The amount of exhaust gas recirculated by the EGR system from the exhaust passage to the intake passage is regulated by an EGR valve provided on an EGR gas passage. When the EGR valve opens, recirculation from the exhaust passage to the intake passage is performed. When the EGR valve closes, recirculation from the exhaust passage to the intake passage is stopped.

When exhaust gas is recirculated into the cylinder, the combustion temperature within the cylinder decreases. Consequently, knocking hardly occurs. Since knocking hardly occurs, the need to retard ignition timing decreases. Thus, with recirculation of exhaust gas into the cylinder, ignition timing is advanced.

At this time, for example, if a passage provided for any of a plurality of cylinders for allowing exhaust gas to be returned into the cylinder is clogged, the advancement of ignition timing could be accompanied by occurrence of knocking. If the ignition timing is retarded in order to reduce knocking, a combustion state could be degraded in cylinders to which exhaust gas is recirculated normally. Therefore, it is necessary to identify the cylinder for which the passage for allowing exhaust gas to be returned into the cylinder is clogged, and to take appropriate measures.

Japanese Patent Laying-Open No. 2010-25059 discloses, in paragraph 34 for example, that when an intake pressure sensor detects a decrease of the intake pressure below a target pressure, and a knock sensor detects occurrence of knocking at any particular cylinder, ignition timing of the particular cylinder is retarded by a spark plug without changing an opening position of an EGR valve.

However, the intake pressure may decrease and knocking may occur even if a passage for allowing exhaust gas to be returned into the cylinder is not clogged. Therefore, with the method described in Japanese Patent Laying-Open No. 2010-25059, there could be a case where clogging of a passage for allowing exhaust gas to be returned into a cylinder is erroneously detected.

SUMMARY OF THE INVENTION

An object of the present invention is to determine, with good accuracy, that a passage for allowing exhaust gas to be returned into a cylinder has been clogged.

In an embodiment, provided is an abnormality determination apparatus for an internal combustion engine that includes a plurality of cylinders and passages provided for the plurality of cylinders respectively for allowing exhaust gas discharged from the cylinders to be returned to the cylinders. The apparatus includes a knock sensor and a control unit that controls the internal combustion engine. The control unit returns exhaust gas discharged from the cylinders to the cylinders through the passages and advances ignition timing in the plurality of cylinders. The control unit changes ignition timing cylinder by cylinder when no knocking had occurred before the exhaust gas is returned to the cylinders while the ignition timing is advanced and knocking occurred after the exhaust gas is returned to the cylinders while the ignition timing is advanced. The control unit determines that a passage provided for a cylinder in which the change in ignition timing caused a change in a state of knocking occurrence is clogged.

In another embodiment, provided is an abnormality determination method for an internal combustion engine that includes a plurality of cylinders and passages provided for the plurality of cylinders respectively for allowing exhaust gas discharged from the cylinders to be returned to the cylinders. The method includes the steps of determining whether or not knocking has occurred, returning exhaust gas discharged from the cylinders to the cylinders through the passages and advancing ignition timing in the plurality of cylinders, changing ignition timing cylinder by cylinder when no knocking had occurred before the exhaust gas is returned to the cylinders while the ignition timing is advanced and knocking occurred after the exhaust gas is returned to the cylinders while the ignition timing is advanced, and determining that a passage provided for a cylinder in which the change in ignition timing caused a change in a state of knocking occurrence is clogged.

According to these configurations, ignition timing in the plurality of cylinders is advanced concurrently with returning exhaust gas discharged from the cylinders to the cylinders. When exhaust gas is recirculated normally, the advancement of ignition timing does not cause knocking. If a passage provided for any of the cylinders to recirculate exhaust gas is clogged, the advancement of ignition timing causes knocking. Therefore, when no knocking had occurred before the exhaust gas is returned to the cylinders while the ignition timing is advanced and knocking occurred after the exhaust gas is returned to the cylinders while the ignition timing is advanced, it is considered that, for any of the cylinders, the passage to return exhaust gas to the cylinder is clogged. In this case, ignition timing is changed cylinder by cylinder. In a cylinder to which exhaust gas is recirculated normally, the state of knocking occurrence does not change. That is, regardless of whether ignition timing is retarded or advanced, no knocking occurs. In a cylinder for which the passage to return exhaust gas to the cylinder is clogged, the change in ignition timing can cause a change in the state of knocking occurrence. That is, switching between a state in which knocking occurs and a state in which no knocking occur is made. Accordingly, a passage provided for a cylinder in which a change in ignition timing caused a change in the state of knocking occurrence is determined to be clogged. In this way, when a state before exhaust gas was returned into a cylinder and a state after exhaust gas was returned into a cylinder differ from each other, it is determined that the passage to return exhaust gas into the cylinder is clogged. It can therefore be determined with good accuracy that a passage to return exhaust gas into a cylinder has been clogged.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
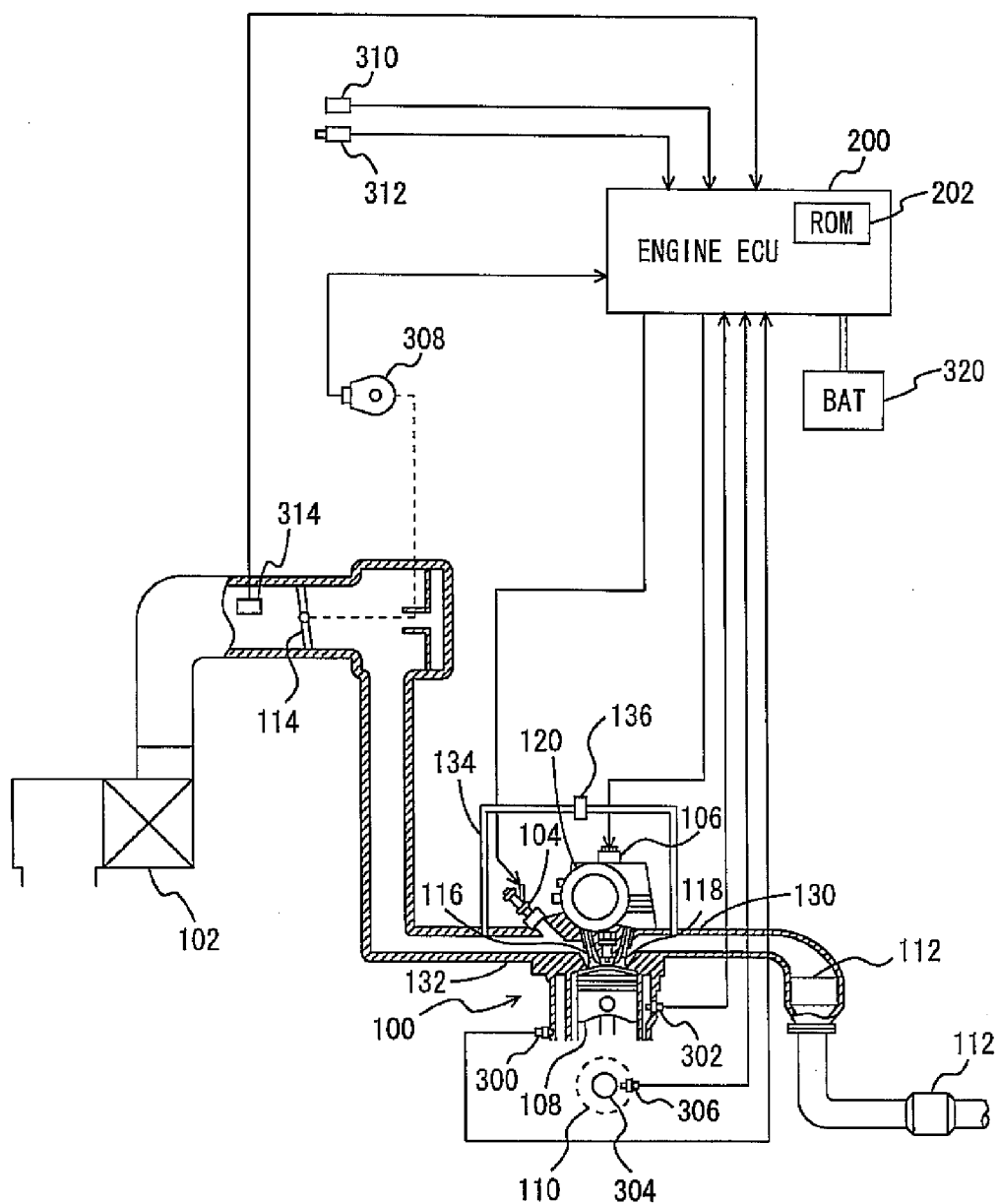
FIG. 1 schematically shows a structure of an engine.

An embodiment of the present invention will be described hereinafter with reference to the drawings. In the following description, the same parts have the same reference characters allotted. They have the same names and functions. Therefore, detailed description of the same parts is not repeated.

With reference to FIG. 1, an engine 100 is provided with four cylinders. Note that the number of the cylinders is not limited to four, and may be five, six, eight, ten or twelve, for example.

An abnormality determination apparatus according to the present embodiment is accomplished by a program executed by an engine ECU (Electronic Control Unit) 200, for example.

Engine 100 is an internal combustion engine in which an air-fuel mixture of air suctioned from an air cleaner 102 and fuel injected from an injector 104 is ignited by a spark plug 106 and burnt in a combustion chamber.

The ignition timing is set according to an operation state of engine 100. In the following description, the ignition timing that is set according to the operation state of engine 100 may also be referred to as basic ignition timing. For example, when knocking occurs, the ignition timing is retarded from the basic ignition timing.

The basic ignition timing is set according to a map using engine speed NE and load KL as parameters. Load KL is calculated based on the quantity of intake air detected by an air flow meter 314 to be described below and engine speed NE or the like. Note that the method of calculating load KL may use a well-known general technique and that the detailed description thereof is therefore not repeated here.

When the air-fuel mixture is burnt, a piston 108 is pushed down by the combustion pressure and a crankshaft 110 is rotated. The air-fuel mixture after combustion (exhaust gas) is cleaned by three-way catalysts 112 and thereafter exhausted to the outside of the vehicle. The quantity of air suctioned into engine 100 is regulated by a throttle valve 114. When an intake valve 116 opens, the air-fuel mixture is introduced into the combustion chamber. When an exhaust valve 118 opens, the exhaust gas is discharged from the combustion chamber.

The phase, i.e., the open/close timing of intake valve 116 is changed by a VVT (Variable Valve Timing) mechanism 120. Note that the phase of exhaust valve 118, besides intake valve 116, may be changed.

In the present embodiment, engine 100 has an EGR system. The EGR system reduces pumping loss and unburned gas by an external EGR for allowing exhaust gas discharged from the cylinders to an exhaust passage 130 to be recirculated to an intake passage 132.

The amount of exhaust gas recirculated by the EGR system from exhaust passage 130 to intake passage 132 is regulated by an EGR valve 136 provided on an EGR gas passage 134. When EGR valve 136 opens, recirculation from exhaust passage 130 to intake passage 132 is performed. When EGR valve 136 closes, recirculation from exhaust passage 130 to intake passage 132 is stopped.

Figure 2:
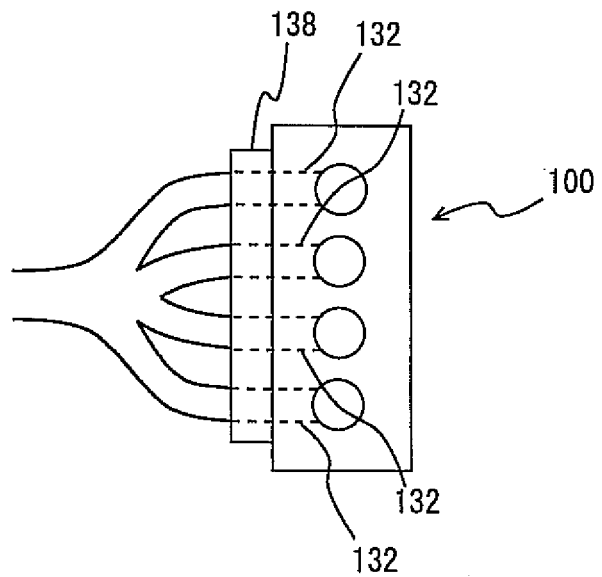
FIG. 2 shows an EGR delivery chamber.
Figure 3:
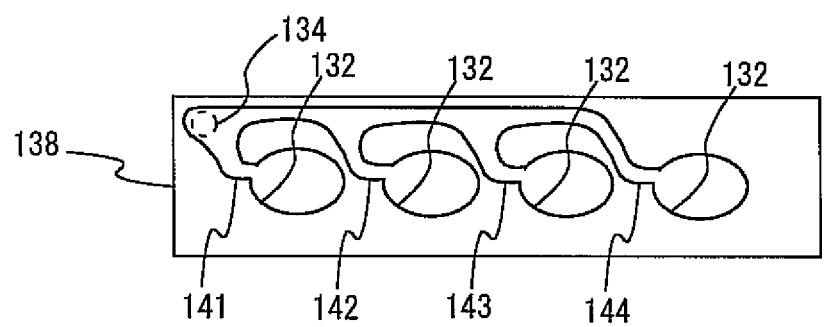
FIG. 3 is a cross sectional view of an EGR delivery chamber.

As shown in FIG. 2, exhaust gas is introduced from an EGR delivery chamber 138, which is provided between an intake manifold and a cylinder head, into an intake passage 132 provided for each cylinder. An example of a cross section of EGR delivery chamber 138 is shown in FIG. 3. As shown in FIG. 3, intake passage 132 is formed to pass through EGR delivery chamber 138. Passages 141 to 144 are formed within EGR delivery chamber 138, for the plurality of cylinders, respectively, for allowing exhaust gas to be returned to respective cylinder.

Returning to FIG. 1, engine 100 is controlled by engine ECU 200. Connected to engine ECU 200 are a knock sensor 300, a water temperature sensor 302, a crank position sensor 306 provided to face a timing rotor 304, a throttle opening position sensor 308, a vehicle speed sensor 310, an ignition switch 312, and air flow meter 314.

Knock sensor 300 is provided to a cylinder block of engine 100. Knock sensor 300 has a piezoelectric element. Knock sensor 300 generates a voltage in response to vibration of engine 100. The magnitude of the voltage corresponds to the magnitude of vibration. Knock sensor 300 sends a signal representing the voltage to engine ECU 200.

In the present embodiment, engine ECU 200 is implemented with a knock control system which determines whether knocking has occurred based on the signal sent from knock sensor 300. The system retards ignition timing when it is determined that knocking has occurred and advances initiation timing when it is determined that no knocking has occurred.

For example, when the magnitude of vibration detected by knock sensor 300 is larger than a threshold value, it is determined that knocking has occurred. Note that the method of determining whether knocking has occurred may use a well-known general technique and that the detailed description thereof is therefore not repeated here.

Water temperature sensor 302 detects the temperature of a coolant in a water jacket of engine 100 (water temperature) and sends a signal representing the detection result to engine ECU 200.

Timing rotor 304 is provided to crankshaft 110 and rotates together with crankshaft 110. On the outer periphery of timing rotor 304, a plurality of protrusions are provided at predetermined intervals. Crank position sensor 306 is provided to face the protrusions of timing rotor 304. When timing rotor 304 rotates, an air gap between the protrusion of timing rotor 304 and crank position sensor 306 changes and, as a result, the magnetic flux passing through a coil portion of crank position sensor 306 increases/decreases to generate an electromotive force in the coil portion. Crank position sensor 306 sends a signal representing the electromotive force to engine ECU 200. Engine ECU 200 detects the crank angle and the number of revolutions of crankshaft 110 (engine speed NE) based on the signal sent from crank position sensor 306.

Throttle opening position sensor 308 detects a throttle opening position and sends a signal representing the detection result to engine ECU 200. Vehicle speed sensor 310 detects the number of revolutions of a wheel (not shown) and sends a signal representing the detection result to engine ECU 200. Engine ECU 200 calculates the vehicle speed based on the number of revolutions of the wheel. Ignition switch 312 is turned on by a driver when engine 100 is to be started.

Air flow meter 314 detects the quantity of air suctioned into engine 100 and sends a signal representing the detection result to engine ECU 200. In the present embodiment, for air flow meter 314, a hot-wire air flow meter having therein an intake temperature sensor is employed. Thus, air flow meter 314 detects the temperature of air suctioned into engine 100 (intake temperature) and detects the quantity of air suctioned into engine 100. Note that the intake temperature sensor may be provided separately from air flow meter 314.

Engine ECU 200 is operated by electric power supplied from an auxiliary battery 320 that is a power supply. Engine ECU 200 performs operation processes based on signals sent from respective sensors and ignition switch 312 as well as a map and a program stored in a ROM (Read-Only Memory) 202, and controls relevant devices so as to operate engine 100 in a desired state.

Figure 4:
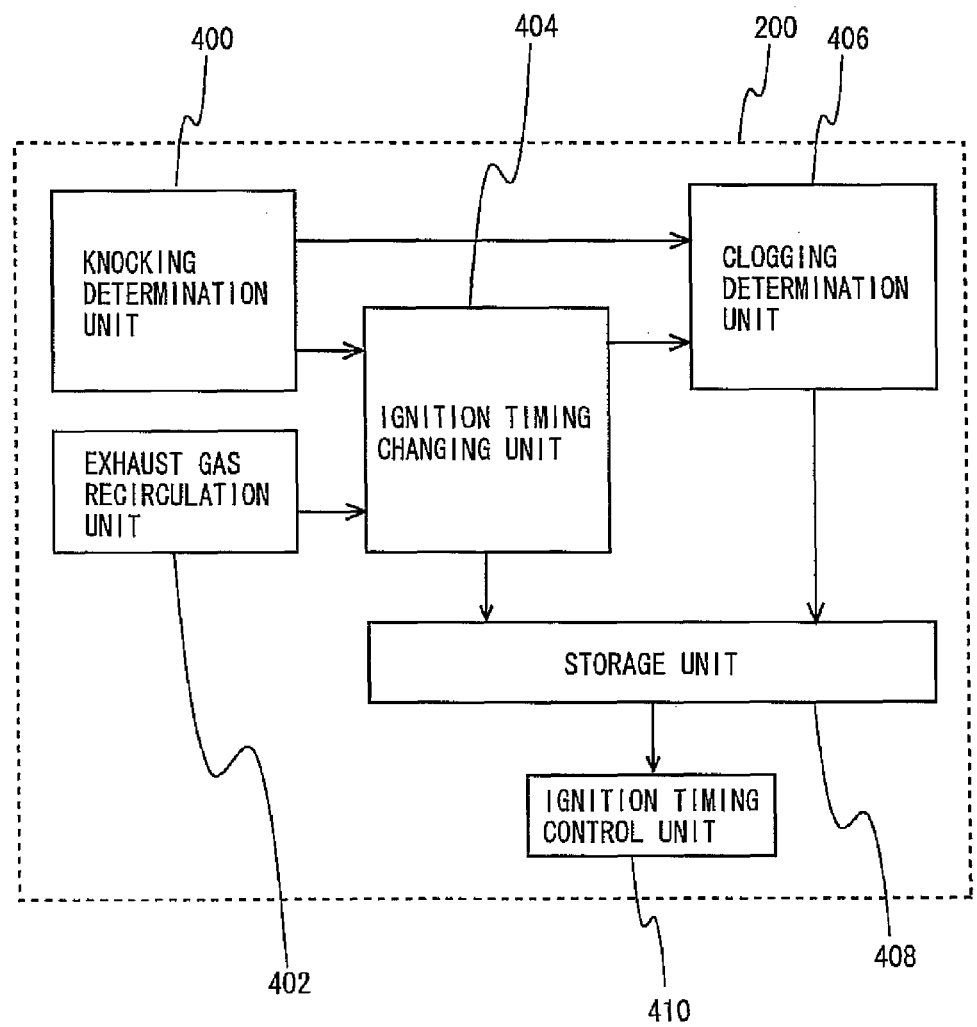
FIG. 4 is a functional block diagram of an ECU.

Referring to FIG. 4, a function of engine ECU 200 will be described below. The functions described below may be implemented by software or hardware.

Engine ECU 200 includes a knock determination unit 400, an exhaust gas recirculation unit 402, an ignition timing changing unit 404, a clogging determination unit 406, a storage unit 408, and an ignition timing control unit 410.

Knock determination unit 400 determines whether or not knocking has occurred based on the signal sent from knock sensor 300. Note that the method of determining whether or not knocking has occurred may use a well-known general technique and that the detailed description thereof is therefore not repeated here.

Figure 5:
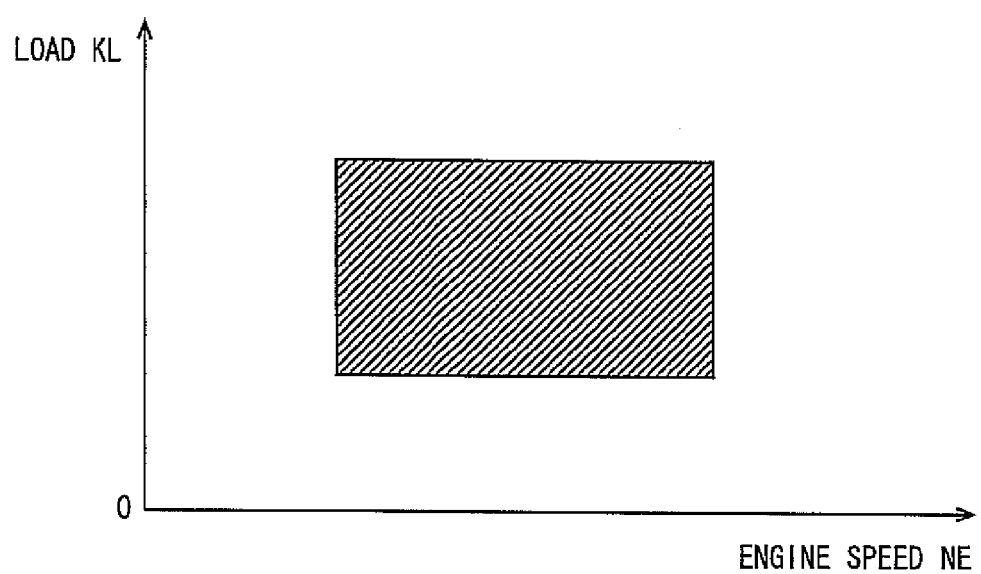
FIG. 5 shows an operation state for which an external EGR is performed.

Exhaust gas recirculation unit 402 controls EGR valve 136 so as to return exhaust gas into each cylinder through passage 141 to 144 for allowing exhaust gas to be returned to intake passage 132. For example, exhaust gas is recirculated according to a map using engine speed NE and load KL as parameters. When the operation state of engine 100 is within the diagonally shaded area in a map shown in FIG. 5, EGR valve 136 is controlled to open and the external EGR is performed. When the operation state of engine 100 is outside the diagonally shaded area shown in FIG. 5, EGR valve 136 is controlled to close and the external EGR is stopped. Note that the method of recirculating exhaust gas is not limited to this.

Exhaust gas recirculation unit 402 controls EGR valve 136 so as to return exhaust gas into each cylinder and controls spark plug 106 so as to advance ignition timing of the plurality of cylinders (all cylinders). For example, ignition timing is advanced to MBT (Minimum advance for Best Torque) at which output torque reaches the maximum, or to the basic ignition timing. Note that the amount of advancement of ignition timing is not limited to this.

Returning to FIG. 4, ignition timing changing unit 404 changes ignition timing cylinder by cylinder, when no knocking had occurred before the exhaust gas to the cylinders is returned while the ignition timing is advanced and knocking occurred after the exhaust gas is returned to the cylinders while the ignition timing is advanced. In what sequential order cylinders are subjected to an ignition timing change is determined arbitrarily by a developer.

In the present embodiment, ignition timing is retarded cylinder by cylinder. For example, while the external EGR is being performed, ignition timing of all cylinders is retarded until no knocking occurs and the ignition timing at which no knocking occurs is memorized. Subsequently, ignition timing of all cylinders is advanced again and thereafter ignition timing is retarded cylinder by cylinder to the ignition timing at which no knocking occurs. Note that the method of retarding ignition timing is not limited to this.

Ignition timing may be advanced, rather than retarded. For example, while an external EGR is being performed, ignition timing of all cylinders is retarded until no knocking occurs, and thereafter, ignition timing may be advanced to predetermined ignition timing (for example, MBT).

Clogging determination unit 406 determines that, among the plurality of passages 141 to 144 for returning exhaust gas to respective cylinders, a passage provided for a cylinder in which a change in ignition timing caused a change in a state of knocking occurrence state is clogged.

In the present embodiment, a passage provided for a cylinder in which the retardation of ignition timing caused a shift from a state in which knocking occurs to a state in which no knocking occurs, is determined to be clogged.

When ignition timing is advanced rather than retarded, the determination may be made in such a manner that a passage provided for a cylinder in which the advancement of ignition timing caused a shift from the state in which no knocking occurs to the state in which knocking occurs is determined to be clogged.

Storage unit 408 memorizes the ignition timing which caused the shift from the state in which knocking occurs to the state in which no knocking occurs. That is, when it is determined that a passage for returning exhaust gas to a cylinder is clogged, the ignition timing at which no knocking occurs in this cylinder is learned.

When exhaust gas discharged from cylinders is returned to the cylinders through the passages provided for returning the exhaust gas to the cylinders, ignition timing control unit 410 controls ignition timing in such a manner that the ignition timing of a cylinder for which it has been determined that the corresponding passage has been clogged matches the memorized ignition timing.

That is, when this or subsequent external EGR is performed, the ignition timing of the cylinder for which it has been determined that the passage for returning exhaust gas to the cylinder is clogged is retarded to the learned ignition timing.

Figure 6:
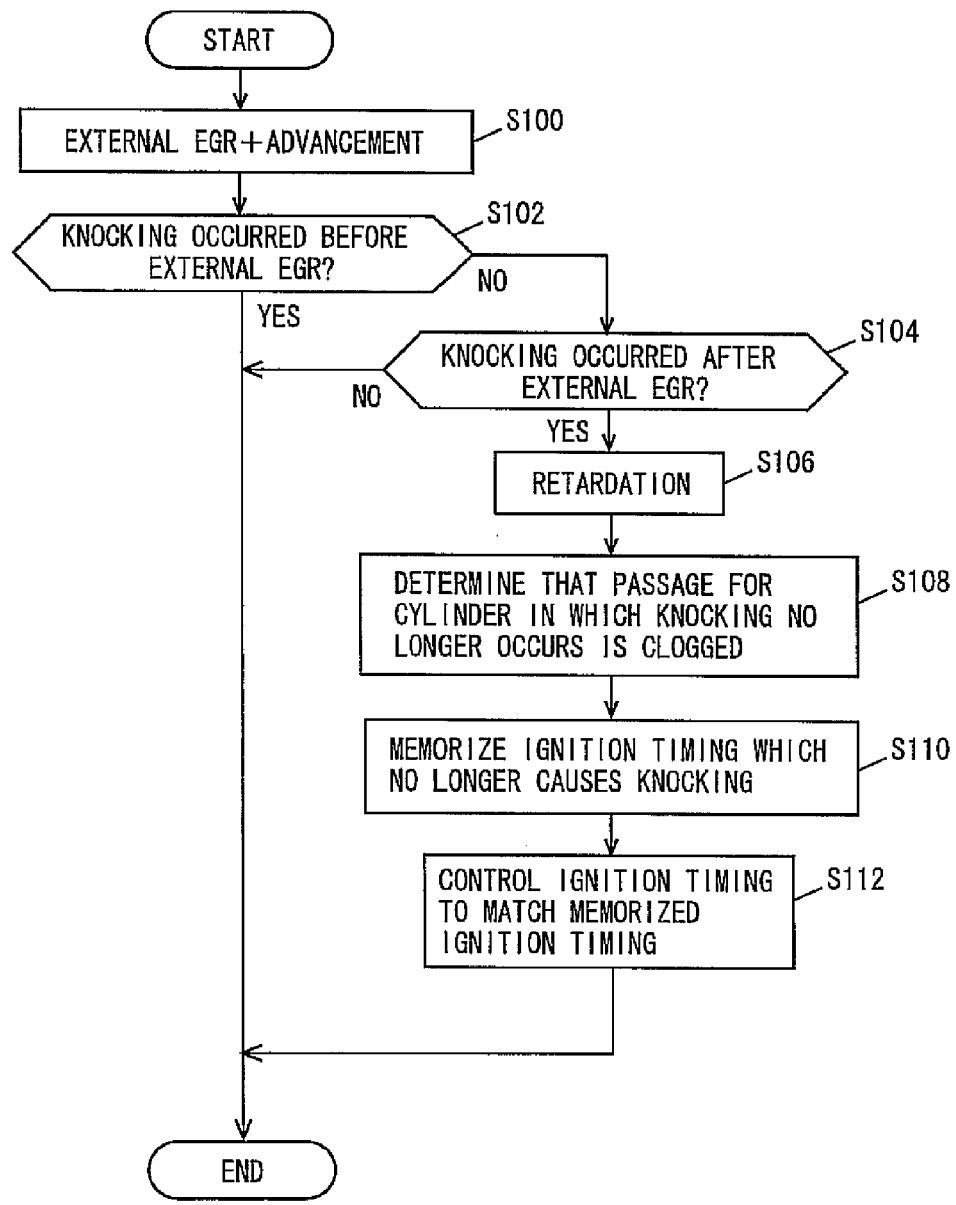
FIG. 6 is a flowchart of a process performed by an engine ECU.

Referring to FIG. 6, a process performed by engine ECU 200 will be described below. In step (hereinafter "step" will be abbreviated as "S") 100, engine ECU 200 performs the external EGR and advances ignition timing.

In S102, engine ECU 200 determines whether or not knocking had occurred before performing the external EGR and advancing the ignition timing. When knocking had occurred (YES in S102), this process ends. When no knocking had occurred (NO in S102), the process proceeds to S104.

In S104, engine ECU 200 determines whether or not knocking has occurred after performing the external EGR and advancing the ignition timing. When knocking has occurred (YES in S104), the process proceeds to S106. When no knocking has occurred (NO in S104), the process ends.

Note that a comparison may be made between an amount of retardation for reducing knocking in a state in which the external EGR is stopped and an amount of retardation for reducing knocking in a state in which the external EGR is performed. More specifically, the process may proceed to S106 when, by not less than a predetermined value, the amount of retardation for reducing knocking in the state in which the external EGR is performed is greater than the amount of retardation for reducing knocking in the state in which the external EGR is stopped.

In S106, engine ECU 200 changes ignition timing cylinder by cylinder in a sequential order. More specifically, ignition timing is retarded.

In S108, engine ECU 200 determines that a passage provided for a cylinder in which the change in ignition timing caused a change in a state of knocking occurrence is clogged. More specifically, a passage provided for a cylinder in which the retardation of ignition timing caused a shift from a state in which knocking occurs to a state in which no knocking occurs is determined to be clogged.

In S110, engine ECU 200 memorize the ignition timing which caused the shift from the state in which knocking occurs to the state in which no knocking occurs. For example, the ignition timing which caused the shift from the state in which knocking occurs to the state in which no knocking occurs is stored in a RAM (Random Access Memory).

In S112, engine ECU 200 controls the ignition timing of the cylinder for which it has been determined that the corresponding passage is clogged, so that the ignition timing matches the memorized ignition timing.

As described above, according to the present embodiment, ignition timing is changed cylinder by cylinder when no knocking had occurred before exhaust gas is returned to the cylinders while ignition timing is advanced and knocking occurred after the exhaust gas is returned to the cylinders while the ignition timing is advanced. A passage provided for a cylinder in which the change in ignition timing caused a change in a state of knocking occurrence is determined to be clogged. It can thereby be determined whether or not a passage is clogged based on the difference between a state in which exhaust gas is returned into the cylinders and a state in which no exhaust gas is returned into the cylinders.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. An abnormality determination apparatus for an internal combustion engine including a plurality of cylinders and EGR passages provided for the plurality of cylinders respectively for allowing exhaust gas discharged from the cylinders to be returned to the cylinders, the apparatus comprising:
a knock sensor; and
a control unit configured to,
return exhaust gas to the cylinders through the EGR passages,
advance ignition timing in the plurality of cylinders when exhaust gas is returned to the cylinders,
determine whether knocking occurred based on a signal sent from the knock sensor,
change an ignition timing in one cylinder after another when knocking occurred after the exhaust gas is returned to the cylinders and the ignition timing is advanced while no knocking had occurred before the exhaust gas is returned to the cylinders and the ignition timing is advanced, and
determine that one of the EGR passages provided for one of the cylinders, in which the state of knocking occurrence is changed by changing the ignition timing, is clogged.

2. The abnormality determination apparatus for an internal combustion engine according to claim 1, wherein
the control unit is configured to
retard ignition timing in one cylinder after another when knocking occurred after the exhaust gas is returned to the cylinders and the ignition timing is advanced while no knocking had occurred before the exhaust gas is returned to the cylinders and the ignition timing is advanced, and
determine that one of the EGR passages provided for one of the cylinders, in which the state in which knocking occurs is shifted to the state in which no knocking occurs by retarding the ignition timing, is clogged.

3. The abnormality determination apparatus for an internal combustion engine according to claim 2, wherein
the control unit is configured to
memorize ignition timing at which the state in which knocking occurs shifts to the state in which no knocking occurs, and
control the ignition timing of the cylinder for which it has been determined that the corresponding EGR passage is clogged, so that the ignition timing matches the memorized ignition timing, when exhaust gas discharged from the cylinders is returned to the cylinders through the EGR passages.

4. The abnormality determination apparatus for an internal combustion engine according to claim 1, wherein
the control unit is configured to
advance ignition timing in one cylinder after another when knocking occurred after the exhaust gas is returned to the cylinders and the ignition timing is advanced while no knocking had occurred before the exhaust gas is returned to the cylinders and the ignition timing is advanced, and
determine that one of the EGR passages provided for one of the cylinders, in which the state in which no knocking occurs is shifted to the state in which knocking occurs by advancing the ignition timing, is clogged.

5. An abnormality determination apparatus for an internal combustion engine including a plurality of cylinders and EGR passages provided for the plurality of cylinders respectively for allowing exhaust gas discharged from the cylinders to be returned to the cylinders, the apparatus comprising:
means for determining whether or not knocking has occurred;
means for returning exhaust gas to the cylinders through the EGR passages, advancing an ignition timing in the plurality of cylinders when exhaust gas is returned to the cylinders, determining whether knocking occurred based on a signal sent from the knock sensor;
means for changing an ignition timing in one cylinder after another when knocking occurred after the exhaust gas is returned to the cylinders and the ignition timing is advanced while no knocking had occurred before the exhaust gas is returned to the cylinders and the ignition timing is advanced; and
means for determining one of the EGR passages provided for one of the cylinders, in which the state of knocking occurrence is changed by changing the ignition timing, is clogged.

* * * * *